United States Patent
Miette et al.

(10) Patent No.: US 9,486,838 B2
(45) Date of Patent: Nov. 8, 2016

(54) LOGISTICS INSTALLATION HAVING SHUTTLE CARTS FOR TRANSPORTING PARCELS, AND HANDHELD UNITS FOR IDENTIFYING THE PARCELS

(71) Applicant: SOLYSTIC, Bagneux (FR)

(72) Inventors: Emmanuel Miette, Saint Gratien (FR); Luc Chriol, Paris (FR)

(73) Assignee: SOLYSTIC, Bagneux (FR)

( * ) Notice: Subject to any disclaimer, the term of this patent is extended or adjusted under 35 U.S.C. 154(b) by 0 days.

(21) Appl. No.: 14/896,695

(22) PCT Filed: Sep. 15, 2015

(86) PCT No.: PCT/FR2015/052470
§ 371 (c)(1),
(2) Date: Dec. 8, 2015

(87) PCT Pub. No.: WO2016/059314
PCT Pub. Date: Apr. 21, 2016

(65) Prior Publication Data
US 2016/0296977 A1    Oct. 13, 2016

(30) Foreign Application Priority Data
Oct. 13, 2014 (FR) ...................... 14 59806

(51) Int. Cl.
*G06Q 10/08* (2012.01)
*B07C 3/02* (2006.01)

(52) U.S. Cl.
CPC ............... *B07C 3/02* (2013.01); *G06Q 10/087* (2013.01)

(58) Field of Classification Search
CPC ...................................................... B07C 3/02
USPC ...................................................... 700/226
See application file for complete search history.

(56) References Cited

U.S. PATENT DOCUMENTS

| 7,493,336 | B2* | 2/2009 | Noonan | G06Q 10/087 |
| 8,308,056 | B2* | 11/2012 | Millan Marco | G06F 17/289 235/375 |
| 8,561,897 | B2* | 10/2013 | Kunzig | G06Q 10/087 235/385 |
| 8,694,154 | B2* | 4/2014 | Winkler | B65G 1/137 700/213 |
| 2002/0008621 | A1 | 1/2002 | Barritz et al. | |
| 2005/0040231 | A1* | 2/2005 | Allison | G06K 7/10881 235/385 |
| 2007/0124077 | A1 | 5/2007 | Hedlund | |
| 2007/0282482 | A1* | 12/2007 | Beucher | G06Q 10/08 700/225 |
| 2011/0046775 | A1* | 2/2011 | Bailey | B07C 3/00 700/224 |

FOREIGN PATENT DOCUMENTS

WO   2011/109655 A1   9/2011
WO   2014/057182 A1   4/2014

* cited by examiner

*Primary Examiner* — Michael K Collins
(74) *Attorney, Agent, or Firm* — Ware, Fressola, Maguire & Barber LLP

(57) ABSTRACT

An installation for handling parcels, with independently self-propelled motor-driven shuttle carts, and a monitoring and control central unit that is suitable for individually and remotely controlling the shuttle carts to travel in freely guided manner on the basis of data indicating the instantaneous three-dimensional position of each shuttle cart, further includes at least one handheld electronic unit suitable for inputting information marked on a parcel and for transmitting said information to the central unit. The central unit is arranged to read the three-dimensional positions of the handheld unit and of the shuttle carts so as to associate said information with a certain shuttle cart, in a memory.

8 Claims, 1 Drawing Sheet

LOGISTICS INSTALLATION HAVING SHUTTLE CARTS FOR TRANSPORTING PARCELS, AND HANDHELD UNITS FOR IDENTIFYING THE PARCELS

CROSS REFERENCE TO RELATED APPLICATIONS

This application is the U.S. National Stage of International Application Number PCT/FR2015/052470 filed on Sep. 15, 2015 which application claims priority under 35 USC §119 to French Patent Application No. 1459806 filed on Oct. 13, 2014, which applications are hereby incorporated by reference in their entirety.

TECHNICAL FIELD

The invention relates to an installation for handling parcels, said installation including independently self-propelled motor-driven shuttle carts, each of which is adapted to transport a parcel, and a monitoring and control central unit that is suitable for individually and remotely controlling said shuttle carts to travel in freely guided manner on the basis of data indicating the instantaneous three-dimensional position of each shuttle cart.

PRIOR ART

Such an installation for handling and sorting parcels, in particular postal parcels, is already known from Patent WO 2014/057182. In that known installation, the shuttle carts are adapted to dock with nesting trolleys on which the parcels are placed manually by an operator.

Each trolley coupled to a shuttle cart and carrying a parcel is moved by the shuttle cart to an input zone in which information marked on the parcel is input.

The information on the parcel can be input at the time, at which each parcel is loaded on a trolley, e.g. by means of a handheld scanner. But such inputting of information at the time at which the parcel is loaded on a trolley can be a procedure that is quite complex and that slows down the rate at which the parcels are loaded onto the trolleys.

The information on the parcel can be input by causing the trolleys as loaded with the parcels to pass through a gate. Such an arrangement suffers from the drawback of reducing the flexibility of how navigation of the shuttles is organized.

SUMMARY OF THE INVENTION

An object of the invention is to remedy those drawbacks.

The basic idea of the invention is to input the information marked on the parcel by means of a roaming handheld electronic unit that is geolocatable by the central unit, and then to detect a match between the three-dimensional position of the handheld unit at the time at which the information on a parcel is input and the three-dimensional position of a shuttle cart that is transporting the parcel, in such a manner as to enable said information, e.g. information identifying the parcel, to be associated with other data representative of the shuttle cart that is transporting the parcel, in the memory of the central unit.

More particularly the invention provides an installation for handling parcels, said installation including independently self-propelled motor-driven shuttle carts, each of which is adapted to transport a parcel, and a monitoring and control central unit that is suitable for individually and remotely controlling said shuttle carts to travel in freely guided manner on the basis of data indicating the instantaneous three-dimensional position of each shuttle cart, said installation being characterized in that it further includes at least one handheld electronic unit suitable for inputting information marked on a parcel when it is in the vicinity of the parcel and for transmitting said information to said central unit, in that said central unit is arranged to read an instantaneous three-dimensional position of said handheld unit in response to said information being input by said handheld unit, and in that said central unit is further arranged so that, on the basis of said data indicating the instantaneous three-dimensional positions of the shuttle carts and on the basis of said instantaneous three-dimensional position of the handheld unit, said central unit detects a match between the instantaneous three-dimensional position of a certain shuttle cart and the instantaneous three-dimensional position of the handheld unit, and, in response to such a match being detected, puts said information associated with said parcel into correspondence with data associated with said certain shuttle cart.

With such an arrangement, an operator holding the handheld unit in the hand can input information on the parcels on the fly in a roaming manner by moving along the travel paths along which the shuttle carts travel.

Such an arrangement offers the advantage of not affecting the time required for loading the parcels onto the shuttle carts.

The input of information on the parcels is not input at a fixed workstation, and therefore it does not put any constraints on the way the navigation of the shuttle carts in the logistics installation is organized.

It is possible to have a plurality of handheld units in the installation at the same time for parcels passing through the inlet of the installation at a high rate.

The installation of the invention may advantageously have the following features:
  said handheld unit may be a bar code reader;
  said handheld unit may be a camera suitable for forming a digital image of the parcel that includes said information;
  the parcels may be postal parcels;
  each parcel may be placed on a trolley coupled to a shuttle cart;
  said information may be unique identification information that uniquely identifies a parcel;
  said handheld unit is equipped with a three-dimensional positioning geotag; and
  the installation may be adapted to perform outward/inward sorting on postal parcels.

BRIEF DESCRIPTION OF THE DRAWING

The present invention can be better understood and other advantages appear more clearly on reading the following detailed description illustrated by the accompanying drawing, in which.

DESCRIPTION OF AN EMBODIMENT

Figure 1:
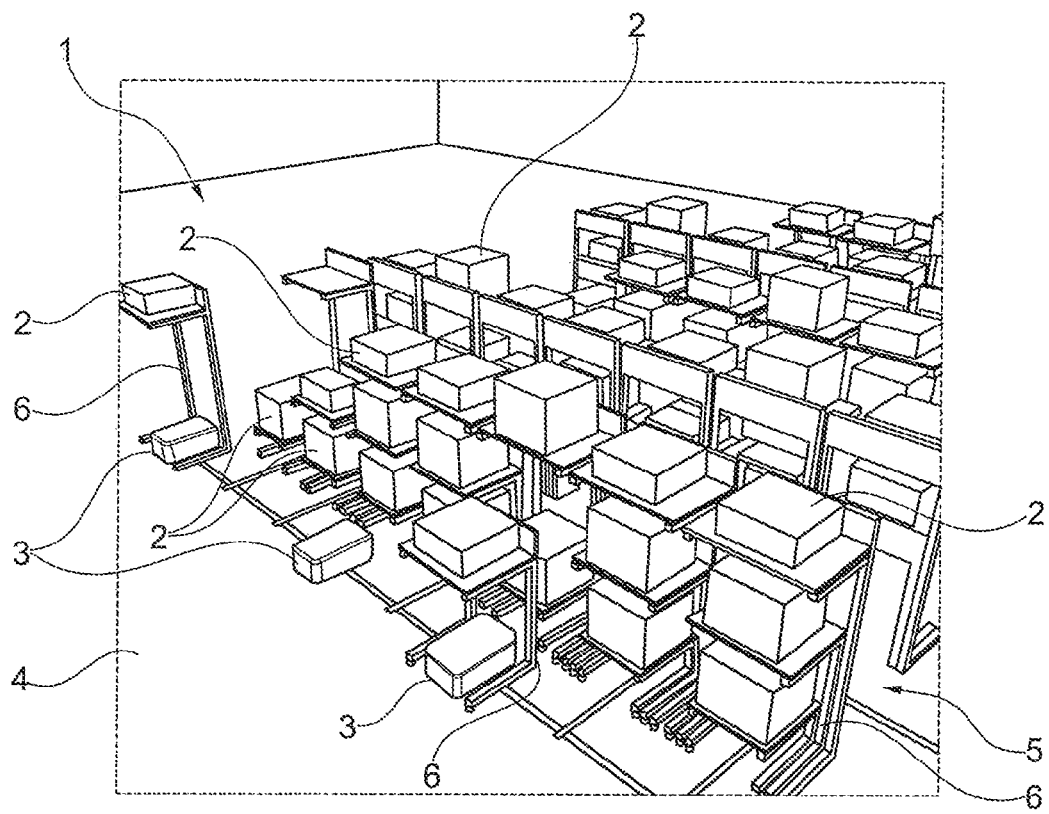
FIG. 1 is a very diagrammatic view of an installation with shuttle carts that, in this example, transport postal parcels, and a handheld unit for inputting identification information on the postal parcels.

FIG. 1 is a fragmentary view of a logistics installation 1 for handling parcels, which, in this example, are postal parcels such as 2, by means of motor-driven shuttle carts 3 that are independently self-propelled and that are remotely guided by a central monitoring and control unit (not shown in FIG. 1).

The shuttle carts travel around a platform 4 that may be provided with unloading and loading points for unloading and loading the parcels 2, which points are accessible to transport means, such as, for example, trucks for bringing parcels 2 and for taking them away.

As shown in FIG. 1, the platform 4 has a stowage zone 5 that is designed to receive parcels 3 loaded on trolleys 6.

In this example, the trolleys 6 are nesting rack trolleys that can nest together in the stowage zone, as shown in FIG. 1, in such a manner that the parcels can be disposed in superposed manner in the stowage zone 5.

Each trolley 6 has one rack for carrying one parcel 2 at a time. It is designed to be suitable for being coupled to a shuttle cart.

The operating principle of the logistics installation is, in this example, for the parcels that arrive at an unloading point of the platform to be loaded onto the trolleys.

The empty trolleys are brought by the shuttle carts. Once loaded with a parcel, the trolley is transported by the shuttle cart to which it is coupled towards, for example, the stowage zone, where, for example, it is placed in sequenced manner so as to perform postal sorting on the parcels. Once the trolley with its parcel is placed in the stowage zone, the shuttle cart uncouples from the trolley and can return to the loading point.

Figure 2:
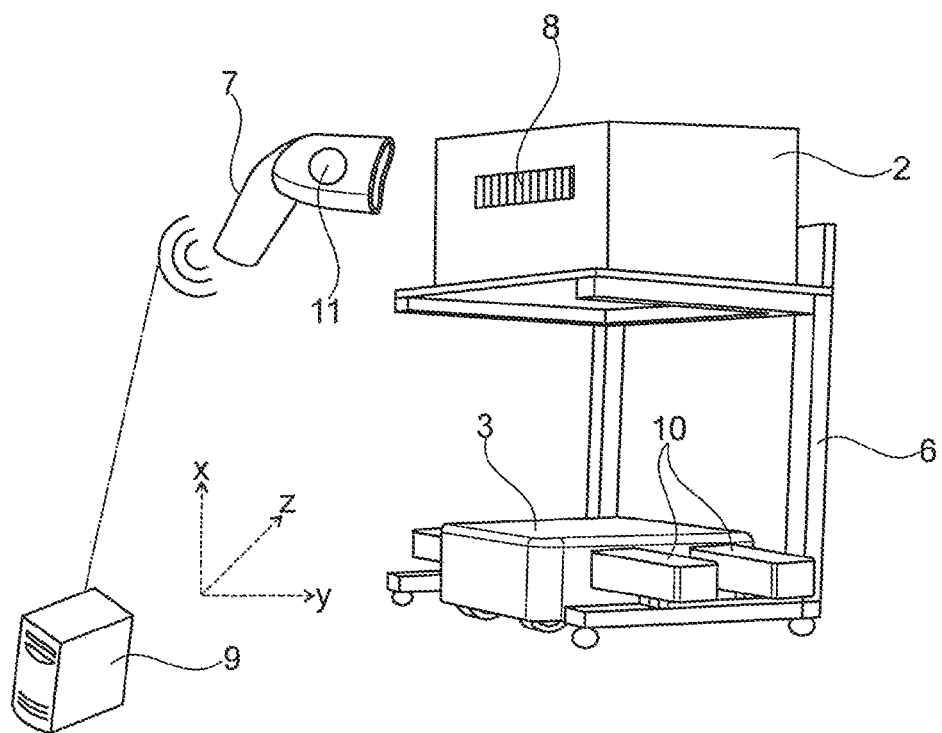
FIG. 2 shows a handheld unit in the vicinity of a parcel for the purpose of inputting information identifying the parcel on the fly.

FIG. 2 shows a handheld electronic unit 7 that is placed in the vicinity of a parcel 2 so as to input information on the parcel and so as to transmit said information to a monitoring and control central unit 9 of the logistics installation 1 that is remote from the handheld unit 7.

Therefore, said information can be input by a roaming operator on the fly by the operator going along travel paths along which the shuttles that transport the parcels to the stowage zone travel.

In the example, the information 8 on the parcel 2 is a bar code for uniquely identifying the parcel. In this example, the handheld unit 7 is a bar code scanner that is connected wirelessly to the central unit 9.

By way of a variant, the information 8 could be a delivery postal address for the parcel and the handheld unit 7 could be a camera suitable for forming a digital image of the parcel including the delivery postal address.

In FIG. 2, the trolley 6 that carries the parcel 2 is coupled to a shuttle 3 via retractable coupling device 10, so that the trolley can be coupled to or uncoupled from the shuttle cart automatically and so that the same shuttle cart can take another trolley so as to continue its logistics handling process.

The central unit 9 is suitable for remotely and individually controlling each shuttle cart 3 in freely guided travel via a wireless communications network between the central unit 9 and each shuttle cart.

In accordance with the invention, the central unit 9 stores the instantaneous three-dimensional positions of the shuttle carts 3 in a memory in such a manner as to be able to guide them around the platform. These instantaneous three-dimensional positions of the shuttle carts may, for example, be produced by a geolocation system with a respective geotag placed on each shuttle cart.

FIG. 2 shows a three-dimensional reference frame 3 represented by three axes xyz. Since the trolleys 6 are nesting trolleys having different heights, when a shuttle cart docks with a trolley, it may be adapted to retrieve from the trolley an indication of the height of the trolley. This height indication, combined with the instantaneous three-dimensional position of the shuttle cart on the corresponding platform determines an estimated instantaneous three-dimensional position for the parcel, as placed on the trolley, along the three axes of the reference frame.

In accordance with the invention, the central unit 9 is also arranged to read the instantaneous three-dimensional position of the handheld unit 7 in response to the bar code 8 on a parcel 2 being input by the handheld unit.

In particular, the handheld unit 7 may be provided with a geotag 11 enabling the central unit 9 to determine the instantaneous three-dimensional position of the handheld unit 7 along the 3 axes of the reference frame.

It is understood that the information 8 is input by means of the handheld unit 7 while the parcel is being transported across the platform from a loading point at which the parcel is loaded on a trolley that is motor-driven by a shuttle cart and a stowage point at which the parcel is stowed, i.e. a point at which the trolley is uncoupled from the shuttle cart.

The instant at which a bar code is received from a handheld unit 7 (with a code identifying the handheld unit 7) may be a good approximation of the instant at which the bar code is input. As a result of a bar code being received by the handheld unit 7, the central unit 9 searches the data in its memory that is indicative of the instantaneous three-dimensional positions of the shuttle carts in order to detect a match between the instantaneous three-dimensional position of a certain shuttle cart along the three axes of the reference frame (taking account of the height of the trolley coupled to the shuttle cart) and the instantaneous three-dimensional position of the handheld unit 7 in the same reference frame.

In response to this detection, the central unit 9 can then establish, in its memory, a correspondence between said shuttle cart and the bar code physically identifying the parcel, thereby then making it possible to perform individual processing on the parcel.

In practice, in the central unit 9, each of the parcels as loaded onto the trolleys is identified by a logical code.

Each time a bar code on a parcel 2 is input on the fly, and each time detection of a match is established, the central unit 9 may, for example, replace the logical code of the parcel in the memory with the physical identification code that physically identifies the parcel.

In a variant, the instantaneous three-dimensional positions of the shuttle carts and the instantaneous three-dimensional positions of the handheld units may be generated cyclically by the geolocation system and with different frequencies.

It is then possible to make provision for the handheld unit 7 to associate a time stamp indicating the time of input of the information 8 in such a manner as to limit the search field within which a match is searched for in the memory of the central unit 9.

Naturally, the present invention is in no way limited to the above description of one of its embodiments, which can undergo modifications without going beyond the ambit of the invention. The invention is also applicable to articles other than parcels.

What is claimed is:

1. An installation for handling parcels, said installation comprising:
   independently self-propelled motor-driven shuttle carts, each of which is adapted to transport a parcel,
   a monitoring and control central unit that is suitable for individually and remotely controlling said shuttle carts to travel in freely guided manner on the basis of data indicating the instantaneous three-dimensional position of each shuttle cart, and at least one handheld electronic unit suitable for inputting information marked on a parcel when it is in the vicinity of the parcel and for transmitting said information to said central unit, wherein said central unit is configured to read an instantaneous three-dimensional position of said handheld unit in response to said information being input by said handheld unit, and in that said central unit is further configured so that, on the basis of said data indicating the instantaneous there-dimensional positions of the shuttle carts and on the basis of said instantaneous three-dimensional position of the handheld unit, said central unit detects a match between the instantaneous three-dimensional position of a certain shuttle cart and the instantaneous three-dimensional position of the handheld unit, and, in response to such a match being detected, puts said information associated with said parcel into correspondence with data associated with said certain shuttle cart.

2. An installation according to claim 1, wherein said handheld unit is a bar code reader.

3. An installation according to claim 1, wherein said handheld unit is a camera configured to form a digital image of the parcel that includes said information.

4. An installation according to claim 1, wherein the parcels are postal parcels.

5. An installation according to claim 1, wherein each parcel is placed on a trolley coupled to a shuttle cart.

6. An installation according to claim 1, wherein said information is unique identification information that uniquely identifies a parcel.

7. An installation according to claim 1, wherein said handheld unit is equipped with a three-dimensional positioning geotag.

8. An installation according to claim 4, wherein the installation is configured to perform outward/inward sorting on postal parcels.

* * * * *